US008603276B2

(12) United States Patent
Riethmueller

(10) Patent No.: US 8,603,276 B2
(45) Date of Patent: Dec. 10, 2013

(54) MACHINE FOR PRODUCING A CUP

(75) Inventor: Steffen Riethmueller, Widnau (CH)

(73) Assignee: Rundpack AG, Diepoldsau (CH)

( * ) Notice: Subject to any disclaimer, the term of this patent is extended or adjusted under 35 U.S.C. 154(b) by 0 days.

(21) Appl. No.: 13/386,192

(22) PCT Filed: Jul. 22, 2010

(86) PCT No.: PCT/EP2010/004484

§ 371 (c)(1), (2), (4) Date: Feb. 21, 2012

(87) PCT Pub. No.: WO2011/009615

PCT Pub. Date: Jan. 27, 2011

(65) Prior Publication Data

US 2012/0145310 A1 Jun. 14, 2012

(30) Foreign Application Priority Data

Jul. 22, 2009 (AT) ................................ A 1148/2009

(51) Int. Cl.
*B65H 81/00* (2006.01)
*B29C 65/00* (2006.01)

(52) U.S. Cl.
USPC ........... 156/191; 156/184; 156/189; 156/443; 156/446; 493/106; 493/158

(58) Field of Classification Search
USPC ................. 493/104–109, 133, 134, 158, 159; 156/184, 189, 191, 443, 446, 389
See application file for complete search history.

(56) References Cited

U.S. PATENT DOCUMENTS 2,988,968 A 6/1961 Bodendoerfer
3,049,979 A 8/1962 Sayford, Jr.
3,468,226 A * 9/1969 England et al. ............... 493/153
4,452,596 A * 6/1984 Clauss et al. .................. 493/107

(Continued)

FOREIGN PATENT DOCUMENTS

DE 1 159 255 12/1963
DE 195 17 394 11/1996

(Continued)

OTHER PUBLICATIONS

International Search Report of PCT/EP2010/004484, date of mailing Jan. 21, 2011.

*Primary Examiner* — Jeff Aftergut
*Assistant Examiner* — Carson Gross
(74) *Attorney, Agent, or Firm* — Collard & Roe, P.C.

(57) ABSTRACT

The invention relates to a machine (1) and a method for producing a cup (100) from an outer shell (101) and inner cup (102). For this purpose, the machine (1) comprises a plurality of first holding devices (2) that are arranged on a first rotatably housed star- or wheel-like holding device carrier (3), and a plurality of second holding devices (4), arranged on a second rotatably housed star- or wheel-like holding device carrier (5). Further, a first working station arranged at least in the region of the first holding devices (2) for carrying out working steps (A1 . . . A4) and at least one second working station arranged in the region of the second holding devices (4) for carrying out working steps (B1 . . . B5) are provided. Finally, the machine (1) comprises a transfer station (6) for transferring (A4, B1) a finished outer shell (101) from a first holding device (2) to a second holding device (4).

34 Claims, 7 Drawing Sheets

(56) References Cited

U.S. PATENT DOCUMENTS

| | | | | |
|---|---|---|---|---|
| 4,490,130 | A * | 12/1984 | Konzal et al. | 493/106 |
| 5,324,249 | A * | 6/1994 | Konzal | 493/109 |
| 5,992,489 | A | 11/1999 | Busse | |
| 6,165,114 | A | 12/2000 | Stahlecker et al. | |
| 6,663,926 | B1 * | 12/2003 | Okushita et al. | 428/34.2 |
| 6,676,585 | B1 | 1/2004 | Stahlecker et al. | |
| 7,780,378 | B2 | 8/2010 | Schneider | |
| 8,056,457 | B2 | 11/2011 | Stahlecker | |
| 2004/0206445 | A1 * | 10/2004 | Butterworth et al. | 156/187 |
| 2006/0231210 | A1 * | 10/2006 | Brown et al. | 156/567 |
| 2008/0023297 | A1 * | 1/2008 | Schneider | 198/493 |
| 2008/0105097 | A1 | 5/2008 | Stahlecker | |
| 2008/0280743 | A1 * | 11/2008 | Stahlecker et al. | 493/106 |

FOREIGN PATENT DOCUMENTS

| | | |
|---|---|---|
| DE | 197 26 215 | 12/1998 |
| DE | 10 2006 035 569 | 1/2008 |
| EP | 1 918 122 | 5/2008 |
| EP | 1 990 184 | 11/2008 |

* cited by examiner

MACHINE FOR PRODUCING A CUP

CROSS REFERENCE TO RELATED APPLICATIONS

This application is the National Stage of PCT/EP2010/001484 filed on Jul. 22, 2010, which claims priority under 35 U.S.C. §119 of Austrian Application No. A 1148/2009 filed on Jul. 22, 2009, the disclosure of which is incorporated by references. The international application under PCT article 21(2) was not published in English.

The invention relates to a machine for producing a cup made of composite material, namely from an outer shell and an inner cup, as well as a method for producing such a cup.

Disposable cups are currently indispensable and are mostly used for conveying liquid, paste-like or powdered substances from a production site or delivery point to the consumer and for enabling the latter to consume the contents of the cup. Production sites could include for example producers of yoghurt, ready meals and drinks. Delivery points are for example pubs, snack bars or cafes, which generally serve the cup contents without a lid or seal.

FIG. 1 shows a known cup 100 made of composite material consisting of an outer shell 101 in which an inner cup 102 is arranged. It can also be referred to as a combination packaging container, as preferably the inner cup 102 and the outer shell 101 formed from a blank or winding are made of different materials. Such cups 100 also have an open end and a closed end, wherein usually the cross sectional dimension at the open end is larger than at the closed end. The open end section also mostly has a flange-like edge strip, which can be joined, in particular sealed, by a sealing device. Also a wide range of different cross sectional shapes can be used which can also be designed to be different from one another.

In principle, there are several methods for producing this cup 100. One option is to wind the outer shell 101 around the finished inner cup 102. In this case the inner cup 102 is mostly mounted by a mandrel which performs the holding and support function during the winding process.

Another option is to produce the inner cup 102 and outer shell 101 separately and then push them inside one another. For this purpose the inner cup 102 generally comprises a beading in the base area which prevents the outer shell 101 from sliding off the mostly conical or cone-shaped inner cup 102, if the latter is not adhered or is only lightly adhered to the inner cup 102.

Another option is to produce the outer shell 101 first from the blank or winding and to place the latter into the cavity of the mold provided for shaping it prior to the production of the inner cup 102. The inner cup 102 is produced for economic reasons preferably in a deep-drawing process from a film-like material that can be deep-drawn.

The present invention relates to a production method in which a finished outer shell 101 and a finished inner cup 102 are pushed inside one another.

The inner cup 102 and the outer shell 101 are usually made of different materials. For example, the inner cup 102 is often made of plastic or a different material that can be deep-drawn and the outer shell 101 is often made of paper or cardboard. The latter can thus still be printed prior to assembly or prior to the formation of the outer shell from the winding or blank. It is also possible for example to make the inner cup 102 from foil-wrapped cardboard. Furthermore, the outer shell 101 can also be made of plastic, in particular foamed plastic. Furthermore, the outer shell 101 can be designed not only in the form of a sleeve, but can also have the shape of a cup. In this case two cups, namely an inner cup 102 and an outer cup forming the outer shell 101, are pushed inside one another. Lastly, it is also possible for the cup 100 to be made of three materials arranged inside one another, i.e. an inner cup 102 made of (smooth) plastic, an intermediate cup made of foamed plastic and an outer shell 101 made of paper.

The different materials of a cup usually perform different functions. For example, the inner cup 102 is designed to prevent the fluid contained therein from escaping, whilst the outer shell 101 is designed to be printed easily and also to provide thermal protection from the contents of the cup. Lastly, consideration of the environmental impact is also very important in a cup made of composite material.

The large numbers of disposable cups that are used daily require highly automated production methods or machines for producing the latter. Currently known methods or machines do meet existing requirements, but there is room for improvement, particularly with regard to meeting the future—in all probability increased—need for disposable cups or reducing the number of machines operating in parallel.

Therefore, the objective of the invention is to provide a machine and a method, which enable the improved production of cups made of composite material and in particular the shortening of cycles times.

The objective is achieved by a machine for producing a cup made of composite material, namely from an outer shell and an inner cup, according to the invention, namely with a machine comprising:

- a plurality of first holding devices, which are arranged on a first rotatably mounted star- or wheel-like holding device carrier,
- a plurality of second holding devices, which are arranged on a second rotatably mounted star- or wheel-like holding device carrier,
- at least one first workstation arranged in the region of the first holding devices for performing at least one of the steps: providing a winding for forming the outer shell, winding the winding onto or into a first holding device, compressing and/or adhering the ends of the winding wound onto or into a first holding device,
- a transfer station for transferring a finished outer shell from a first holding device to a second holding device and
- at least one second workstation arranged in the region of the second holding devices for performing at least one of the steps: pushing the outer shell in or the inner cup onto a second holding device, pushing a finished inner cup into the finished outer shell or pushing a finished outer shell onto the finished inner cup, checking the finished cup, rejecting the defective cups, removing the finished cups from the second holding device.

The objective is also achieved by a method of producing a cup made of composite material, namely with an outer shell and an inner cup, according to the invention, namely a method, comprising the steps:

- performing at least one of the steps: providing a winding of the outer shell, winding the winding onto or into a first holding device, compressing and/or adhering the ends of the winding wound onto or into a first holding device, in at least one first workstation arranged in the region of a first holding device, which is arranged on a first rotatably mounted star- or wheel-like holding device carrier,
- transferring a finished outer shell from a first holding device to a second holding device, which is arranged on a second rotatably mounted star- or wheel-like holding device carrier, in the region of a transfer station and
- performing at least one of the steps: pushing the outer shell into or the inner cup onto a second holding device, pushing a finished inner cup into the finished outer shell or pushing a finished outer shell onto the finished inner cup, checking the finished cup, rejecting the defective cups, removing the finished cup from the second holding device in at least one second workstation arranged in the region of the second holding device.

According to the invention preferably several first holding devices operate together, which are arranged on a first rotatably mounted star- or wheel-like holding device carrier, comprising a plurality of second holding devices which are arranged on a second rotatably mounted star- or wheel-like holding device carrier. On the first holding devices an outer shell is prepared so that it can be transferred at a transfer station to the second holding devices and is brought together with the inner cup. It is advantageous that the machine is relatively compact due to the use of wheel- or star-like holding device carriers. Also wheel- or star-like structures can be produced relatively easily and are not prone to faults. According to the invention in this way a robust, compact and fault-free machine is provided, which in addition makes it possible to have very short cycle times.

“Finished” in terms of the invention does not necessarily mean “completely finished” but denotes reaching at least the state of the outer shell/the inner cup/the cup, which is necessary for performing the upcoming step. For example, the outer shell may not have been printed prior to adhering and may be printed later (at some point). With regard to the adhesion “finished” means for example that the outer shell has been wound and the adhesive tabs are coated with adhesive.

Advantageous embodiments and developments of the invention are described in the description in association with the Figures of the drawing.

An advantageous variant of the machine according to the invention comprises the following components:

a plurality of third holding devices, which are arranged on a third rotatably mounted star- or wheel-like holding device carrier, at least one third workstation arranged in the region of the third holding devices for performing at least one of the steps: separating the finished inner cups from a stack, applying adhesive onto the outside of the inner cup and a transfer station for transferring a finished inner cup from a third holding device to a second holding device.

In this way inner cups which are supplied to the machine of the invention unprepared, in order to be joined directly to the outer shell, are prepared inside the machine according to the invention. For example, adhesive can be applied to the inner cup, so that it bonds well with the outer shell. In a particularly advantageous variant of the invention the transfer station consists of a compressed air nozzle in a third holding device, by means of which the inner cup can be transferred from a third to a second holding device. In principle, also other transfer stations can consist of a compressed air nozzle, for example the transfer station between the first and second holding device. This functions particularly well, if the outer shell is also shaped in the form of an (outer) cup.

It is advantageous if the first holding devices are designed in the form of mandrels. This variant is an advantage, as the winding of an outer shell can be wound relatively easily around a mandrel to shape the outer shell.

It is an advantage if at least one first opening of a line arranged in the mandrel opens at the first holding devices designed as mandrels respectively at the front circumferential area as seen in the rotational direction of the first holding device and the said opening is in lineconnection with a suction input of a vacuum generator. In this way without additional levers the blank can be held on the holding device carrier in a simple manner.

It is advantageous, if on the first holding device designed as a mandrel respectively on its end section closer to the holding device carrier a sleeve is arranged mounted to be displaceable in axial direction, in order to release the outer shell from the mandrel wound onto the mandrel for transferring to the transfer station. In this way also with more tightly wound outer shells a perfect transfer is prepared and any jamming on the mandrel is prevented.

It is also advantageous, if at least one first outflow openings opens onto the first holding devices designed as mandrels respectively on their circumference and said opening is line-connected with a pressure generator, in particular for compressed air. In this way not only can the release movement from the holding device carrier be supported but in addition also the transfer movement can be performed between two holding device carriers.

It is advantageous, if over the circumference of the first holding devices designed as mandrels a plurality of first outflow openings are arranged, because in this way a more even and directed transfer can be performed.

It is also advantageous if in the area of the first outflow opening or first outflow openings a circumferential channel is arranged in the holding device designed as a mandrel and the first outflow opening opens into the channel. In this way a completely circumferential channel is created for the inflow of the winding wound on the mandrel. Thus a more even transfer movement can be achieved.

It is advantageous if the first outflow opening and/or the channel is aligned so that the latter has or have an outflow direction directed to the side facing away from the center of the first holding device carrier, because in this way not only can the release of the winding from the holding device carrier be performed, but also at the same time the transfer movement can be performed in this way.

It is also advantageous, if the second holding devices are designed as sleeves or rings. In this embodiment the finished outer shells are pushed into rings or sleeves and sit relatively securely for the following steps.

It is also advantageous, if in an inner circumferential area of the second holding device designed as a sleeve or ring at least one second outflow opening is arranged. In this way on the basis of the holding device used as a mount no additional nozzles or lines are required. Thus not only is it possible to reduce the number of components but also assembly errors can be avoided.

It is advantageous, if the second outflow opening is aligned such that the latter has an outflow direction directed in the direction of the first holding device of the first holding device carrier. In this way from the holding device used as a mount the flow of medium for transport can be released directly onto the mandrel.

It is also advantageous if the outflow direction directed to the first holding device is directed to the second outflow opening to the center of the mandrel, because also a counter-flow can be achieved by deflecting the medium flow accordingly on the end face of the mandrel.

It is advantageous, if at least one second openings of a line arranged in the sleeve or the ring opens in an inner circumferential area of the second holding device designed as a sleeve or ring and said opening is in line-connection with a suction input of a vacuum generator. In this way after taking over the outer shell the latter can be mounted.

It is also advantageous, if the third holding devices are designed as mandrels. In this variant of the invention the inner cups are supplied in finished or prefinished form to the machine according to the invention and fitted onto mandrels there, in order to be processed further, for example for the application of adhesive.

It is particularly advantageous, if the first holding devices are designed in the form of mandrels, the second holding devices are designed in the form of as sleeves or rings and the third holding devices are designed in the form of as mandrels. This variant of the invention represents a combination of the three last variants. In this case an outer shell is shaped on a mandrel (first holding device) and then inserted into a ring or a sleeve (second holding device). In the meantime the inner cups are prepared on mandrels (third holding device) and then inserted into the outer shell. This combination thus ensures a particularly unproblematic sequence in the production of a cup made of composite material.

It is also advantageous, if the workstation for winding the winding of the outer shell onto a first holding device designed as a mandrel comprises brushes which brush the winding on rotation of the first holding device carrier in a U-shape onto the mandrel or if the workstation for winding the winding of the outer shell onto the first holding device designed as mandrel comprises levers, which completely wind the U-shaped prebent winding around the mandrel. In this case the winding of the outer shell on the rotation of the first holding device carrier is pre-bent into a U-shape by laterally arranged brushes. Levers then grip the not yet bent ends of the winding, bend them completely around the mandrel and compress the latter. The brushes provide a particularly gentle bending of the winding, whereby damage to the often sensitive outer surfaces of the outer shells is prevented. The brushes are preferably stationary, but can also be moved. From this variant of the invention it is also clear that the design of a process step is not necessarily restricted locally to a workstation at which a first holding device carrier stops. Rather a process step, as shown, can also be performed during the rotation thereof.

It is also advantageous, if the brushes and the two levers are mounted to be fixed in relation to the first holding device carrier on the machine frame of the machine. Thus at certain points workstations are fixed at which predefined steps are performed. In this way it is possible to have fewer machine parts.

It is advantageous if each of the first holding devices is assigned a separate clamping lever and the clamping lever is mounted pivotably on the first holding device carrier relative to the first holding device. In this way during the further rotation of the holding device carrier up to the planned transfer a compression of the adhesive seam can be performed.

It is also advantageous, if the clamping levers are arranged relative to the holding devices designed in the form of a mandrel respectively on the rear circumferential area of the mandrels as viewed in the rotational direction of the first holding device carrier and the clamping levers can be adjusted with their stamps from a position spaced apart from the mandrel into a position bearing against the mandrel. In this way only after completely winding the blank is the adhesive seam compressed. Until then the winding process can be performed unhindered and complicated mechanisms for this are avoided.

In an advantageous variant of the invention the axes of the first and/or second and/or third holding devices are aligned in a star shape on the respective holding device carrier. This arrangement provides a large amount of space for the workstations, which can be aligned substantially radially relative to the rotational axis of a holding device carrier, in particular, if the holding devices are directed outwardly from the inside. In principle it is also possible however, that the holding devices are aligned inwardly from the outside.

In a further advantageous variant of the invention the axes of the first and/or second and/or third holding devices are aligned in the manner of a revolver magazine on the respective holding device carrier. This arrangement provides a more compact structure of the machine, as the workstations are aligned essentially parallel to the axis of a holding device carrier. Of course, star-shaped holding devices can also be combined with holding devices in the manner of a revolver magazine.

It is advantageous if the machine comprises a preparation station for performing one of the following steps prior to providing the winding of the outer shell: separating a winding of an outer shell from a stack, prebending the seam area (in particular the subsequent inner seam area), heating a seam area or the entire winding, applying adhesive to the seam area. In particular, if the outer shells are not provided in prepared form so that they can be wound directly around a first holding device, in the area of the machine according to the invention the necessary preparations can be made. The listed steps should in this case be considered to be examples. Of course, also other or additional steps are possible.

It is also advantageous if the station for prebending the seam area is arranged on the side of the preparation station past which the inner end of the winding in the seam area in the finished outer shell is conveyed. In this way the shaping is shifted to the inner side of the outer shell, by means of which better roundness of the outer shell can be achieved.

It is advantageous if the preparation station comprises cooperating pairs of conveyor belts and the pairs are arranged spaced apart from one another in conveying direction transversely to the conveying direction and thus span a conveying plane. In this way a definite clamping of the still flat windings to be transported is achieved. In this way the stacked and separated windings are conveyed reliably and in a precise cycle to the individual workstations.

It is also advantageous, if the preparation station at the end of the conveyor belts facing the first holding device carrier comprises a feed slide with means for holding the winding to form the outer shell and the feed slide can be adjusted from a position taking the winding from the conveyor belts into a position providing the winding to the first holding device of the first holding device carrier. In this way a definite prepositioning of the winding to be transferred can be achieved and the latter can be transferred after their preparation to the winding station. By means of the adjustment movement also a relative positioning is possible relative to the holding device, whereby the dimensional ratios of the outer shell can be defined simply.

It is also advantageous, if the means for holding the winding on the feed slide are formed by support surfaces spaced apart from one another in transverse direction relative to the movement direction of the feed slide, into which suction opening open and the latter are in line-connection with a suction input of a vacuum generator. In this way the blank is secured gently on its optically attractive outside without there being a risk of damage.

It is advantageous, if between the support surfaces of the feed slide spaced apart from one another in transverse direction a recess is formed in the feed slide, through which on preparing the winding to form the outer shell at least the first holding devices can be moved. Thus up to holding the winding on the holding device a definitely prepositioned holding is possible.

It is also advantageous, if the preparation station for applying adhesive in the seam area comprises at least one nozzle facing the seam area and the latter is guided parallel relative to the conveying plane and transversely relative to the conveying direction of the winding or the transverse adjustment of the nozzle is performed in perpendicular direction relative to the conveying direction of the winding. In this way in cooperation with the blank the application of adhesive is made considerably easier.

It is also advantageous, if the transverse adjustment of the nozzle for applying the adhesive is performed at the same time as the conveying movement of the winding. Owing to this relative movement to one another the smallest amount of space is required for the nozzle arrangement.

It is also advantageous, if the machine comprises an adhesive application nozzle, which in a position of rest is kept clean by a moistened, rotating sponge. Over time deposits of adhesive can build up on the adhesive nozzle, which impair their correct functioning or can even lead to the incorrect functioning of the latter. For this reason it is an advantage in principle to clean the nozzle between applications of adhesive. It is particularly advantageous if this is performed with a rotating, moistened sponge, which—as experiments have shown—is particularly suitable for this task. The nozzle can always be kept clean in this way, particularly if cold or hot glue is applied.

Finally, it is advantageous if the station for applying adhesive onto the seam area is arranged on the side of the preparation station past which the outer lying end of the winding in the finished outer shell is conveyed. In this way the winding of the blank can be performed easily without the applied adhesive being scraped off during the winding process of the applied adhesive.

At this point it should be noted that the variants and possibilities relating to the machine according to the invention and the advantages resulting therefrom can of course also apply to the method according to the invention.

The above embodiments and developments of the invention can be combined in any way and manner.

For a better understanding of the invention the latter is explained in more detail with reference to the following Figures.

In a much simplified schematic representation:

Figure 1:
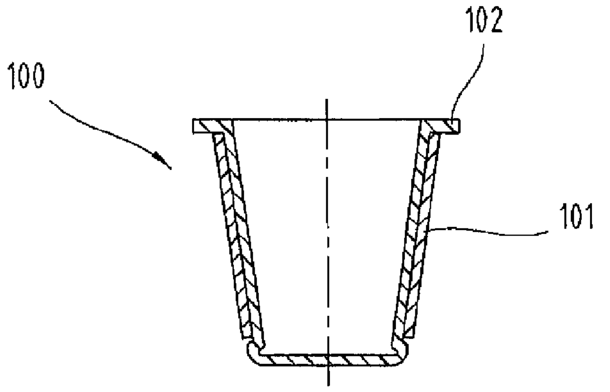
FIG. 1 shows a cup made of composite material according to the prior art.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

Figure 2:
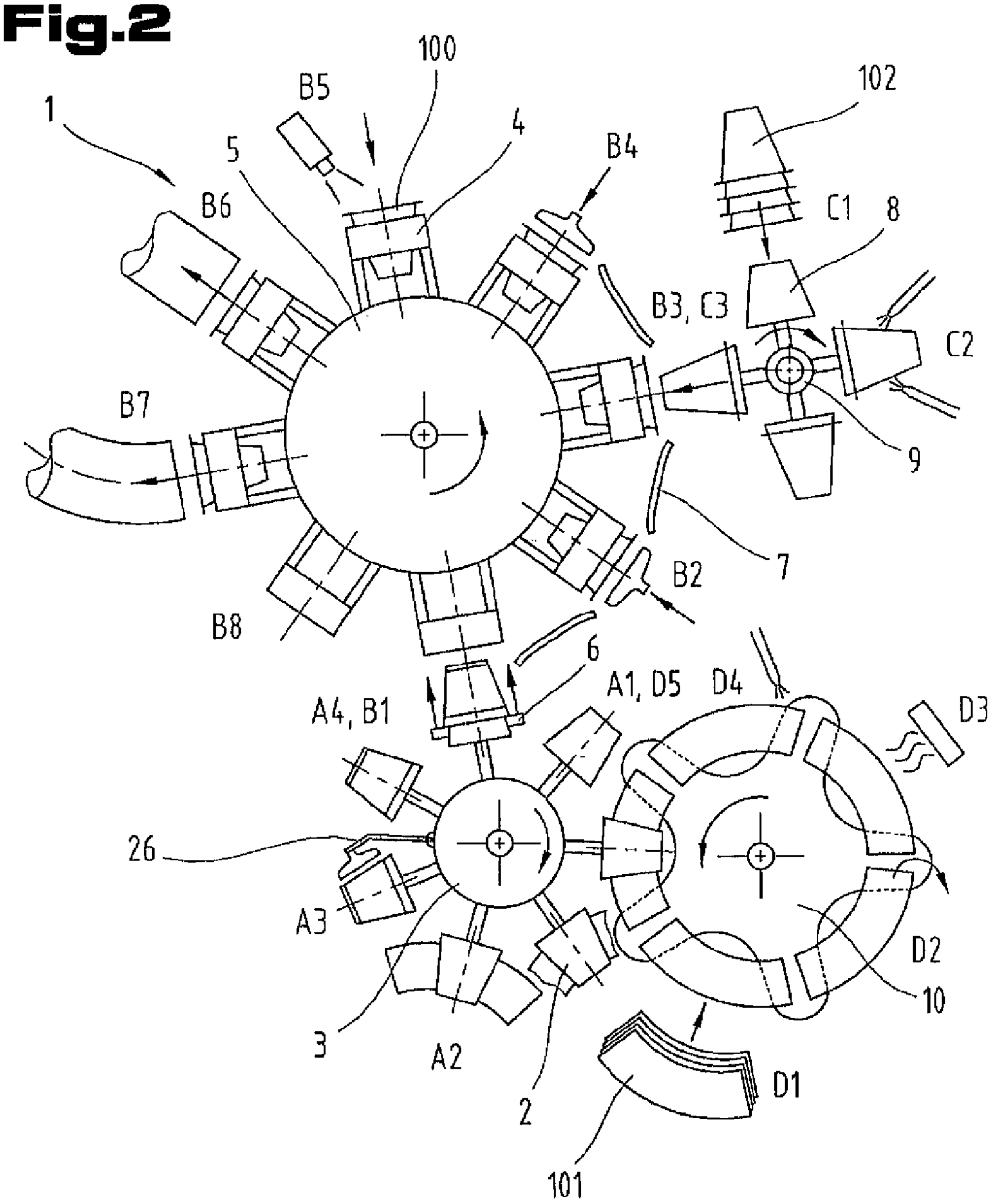
FIG. 2 shows a variant of a machine according to the invention with holding devices arranged in a star shape.

FIG. 2 shows a first variant of a machine 1 according to the invention in a much simplified representation. The machine 1 comprises first holding devices 2, here in the form of mandrels, which are attached onto a first star- or wheel-like holding device carrier 3. The machine 1 also comprises second holding devices 4, here in the form of sleeves or rings, which are attached to a second star- or wheel-like holding device carrier 5.

In the following part of the manufacturing process of a cup 100 is explained. Firstly it should be noted that the steps necessary for this are represented only symbolically, as a representation of the respectively assigned workstations of the machine 1 in every detail would affect the clarity of the overview. In the following reference is only made to steps, of course in the following explanations this also means respectively assigned current workstations.

Figure 5:
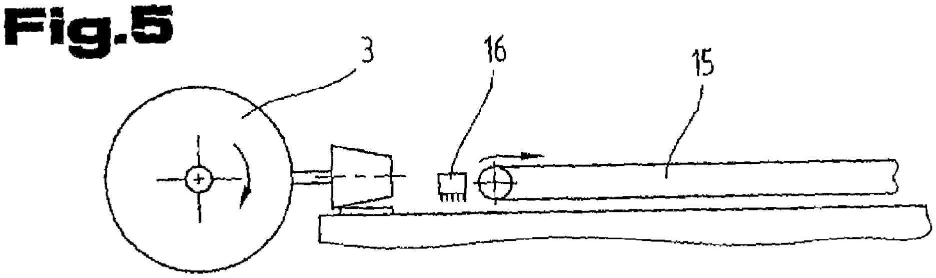
FIG. 5 shows a possible delivery unit for the windings of outer shells by means of a conveyor belt in side view.
Figure 6:
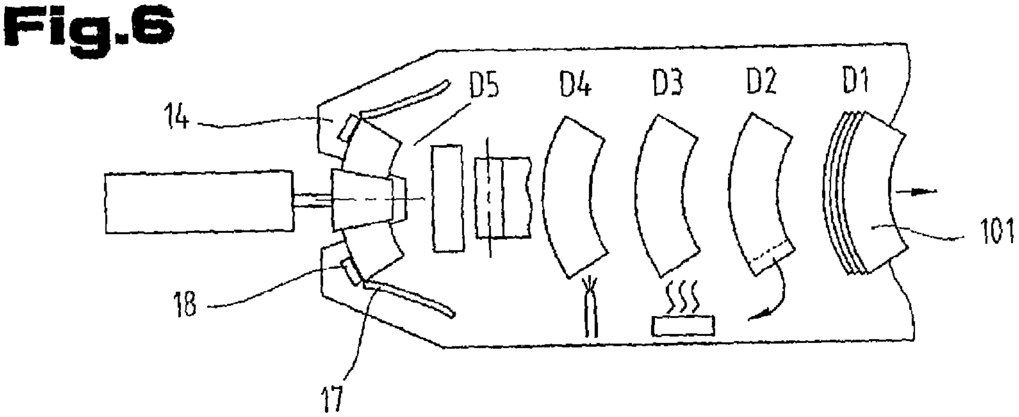
FIG. 6 shows the delivery unit according to FIG. 5, in plan view.

Furthermore, it should be noted, that between the steps the first or the second holding device carrier 3 and 5 are rotated about a position. The rotational movement is thus discontinuous. The rotational movement stops preferably only for a certain period, which corresponds to the time required for the longest step. It is therefore particularly advantageous to divide long steps into several individual steps:

In a first step A1 or in a corresponding workstation a winding or blank for forming an outer shell 101, which is coated with adhesive in the seam area, is supplied and aligned (cf. also FIGS. 5 and 6). The fixing of the winding on the mandrel forming the first holding device 2 is performed here by means of a clamping strip (cf. for this also FIGS. 7 to 10). In a second step A2 the said winding is wound about the mandrel. For this for example tong-like levers can be used, which push the winding against the mandrel. In a particularly advantageous variant the winding is wound around the mandrel during the rotational movement of the first holding device carrier 3 by means of brushes (cf. FIGS. 7 to 10). It is clear from this example that the production steps need not necessarily be performed when the holding device carrier 3 and/or 5 has stopped, but can also be performed during their movement. In a third step A3 the seam of the outer shell 101 is compressed. For this a movable stamp is provided, in particular a heated stamp, which pushes both ends of the winding of the outer shell 101 against one another and onto the first holding device 2, in particular the mandrel. The following two stations are empty and are used for setting the adhesive. It is also possible that in these positions optional workstations can be retrofitted.

The stamp can be released, if it is part of a workstation, as soon as the adhesive provides sufficient adhesive force to prevent the outer shell 101 from falling apart. The stamp can also be part of a first holding device 2 however. In this case it can be connected to a clamping lever 26 which is guided or mounted adjustably, in particularly pivotably on the first holding device carrier 3. As the clamping lever 26 or the stamp is moved along with the holding devices 2, it remains closed until the adhesive has dried and thus pushes the two connecting and overlapping ends of the winding against one another to form the prepared outer shell 101 and the latter onto the first holding device 2 or its mandrel. This variant is an advantage in that the cycle times are not extended unnecessarily because of the setting of the adhesive. In a fourth step A4 the finished outer shell 101 is transferred to a second holding device 4. The latter can be formed by a ring or a sleeve. The fourth step A4 is at the same time the first step B1 in the region of the second holding device carrier 5. The transfer can be performed for example by a displaceable ring or a sleeve-like slide (forming in this example the transfer station 6), which releases the finished outer shell 101 from the mandrel or slips off the latter and possibly pushes at the same time into the second holding device 4, in particular the ring. Here the transfer or the takeover of the outer shell 101 can also be performed by a directed medium flow, in particular an air flow, as described further below.

If necessary, the outer shell 101 can also be drawn by means of a vacuum into the ring. It is also possible that the outer shell 101 is taken from the mandrel by means of tongs.

In the next step B2 the outer shell 101 is readjusted, that is pushed correctly into the mount of the second holding device 4, in particular the ring, as its correct position in the transfer station 6 cannot always be ensured. Preferably, guiding rods 7 prevent the outer shell 101 falling out, if the latter does not sit correctly in the second holding device 4, and thus prevent secure holding by the vacuum. In a next step B3 the prefabricated inner cup 102 is inserted into the outer shell 101.

In an advantageous variant the inner cup 102 is pushed by means of compressed air out of a tube and can thus be moved into the prepositioned outer shell 101.

It would also be possible for the inner cups 102 prepared for the transfer or takeover to be picked up at the base and thus drawn from the second holding device carrier 5 into the outer shell 101 held there. A possible arrangement of a transfer means 41 is shown in simplified form in the following FIG. 18. Thus for example the latter can be designed in the form of a rod, whereby at its end facing the base of the inner cup 102 a vacuum holder is arranged. This can for example be a suction bowl with a suction input of a vacuum unit. Thus the transfer means 41 can be adjusted from a position gripping the cup base and thereby projecting through the ring of the second holding device 4 into the position arranged inside the second holding device carrier 5.

In the next step B4 the inner cup 102 is readjusted or locked into the outer shell 101, in case after the insertion process there is still no complete locking between the beading of the inner cup 102 and the lower edge of the outer shell 101 facing the base. By means of applying pressure or by means of a not shown stamp the base of the inner cup 102 can bulge outwards in particular and thus the locking in place of the beading attached to the inner cup 102 is facilitated, as in this way the external dimension thereof is reduced so far that the clear through cross section on the outer shell 101 does not need to be over-extended. Optionally or in addition the inner cup 102 can be delivered with adhesive already applied. If necessary the beading in the base part of the inner cup 102 can be omitted, if the adhesive ensures that the outer shell 101 adheres reliably to the inner cup 102. This is disadvantageous as it makes the recycling of the cup 100 after use more difficult. Optionally the readjustment can also be omitted. Thus the steps B3 and B4 can also be combined, for example if the inner cup 102 is inserted at high speed into the outer shell 101.

In a further step B5 it is checked whether the cup 100 has been produced correctly (symbolized here by a camera). If this is not the case the cup 100 is conveyed into a waste container, for example by means of a tube system in step B6. If the cup 100 is satisfactory it is taken off the ring in a last step B7. This can be performed for example by means of a compressed air pulse, which blows the cup 100 for example into a connected conveyor tube. One of the workstations, in the present case workstation B8, is not allocated its own processing step and is thus free. It would also be possible to provide said free station at a different point or to use the latter for an additional necessary step. This sequence is only selected by way of example and can be adjusted freely as necessary.

As already mentioned the inner cup 102 can be supplied already coated with adhesive. This preparation can however also be performed in the machine 1. In the following the steps required for this are explained:

In a first step C1 the inner cups 102 supplied in a stack are pushed separately onto a third holding device 8, which is arranged on a third holding device carrier 9. The separation can be performed by means of rollers with a spiral-shaped groove, into which the edge of the cup engages (see also FIGS. 3 and 4). The third holding device carrier 9 moves in step with the two other holding device carriers 3 and 5 and thus advances the inner cup 102 to the next workstation. In a second step C2 the inner cup 102 is coated with adhesive by means of nozzles, in particular with hot adhesive. The next workstation is shown to be empty. In a last step C3 the inner cup 102 coated with adhesive is pushed by the third holding device 8, which is also formed for example by a mandrel, into the prepared outer shell 101. Step C3 thus corresponds to step B3.

As already mentioned the winding of the outer shell 101 can also be supplied already coated with adhesive. The preparation of the winding can also be performed however in the machine 1. The necessary steps for this are explained in the following:

In a first step D1 the windings supplied in a stack are separated and placed on a rotary disc 10. The separation can be performed by fanning out the stack by means of compressed air and suctioning the bottom winding. The rotary disc 10 moves in step with the holding device carrier 3, 5 and 9. In a second step D2 the adhesive tab (in particular subsequently the inner tab) can be prebent, so that the outer surface of the outer shell 101 in its overlapping area later is as even as possible in terms of roundness. In a next step D3 the winding is heated or only the tabs to be adhered are heated in order to accelerate the subsequent adhesion process. Optionally the winding can also be embossed. If the embossing press is heated, furthermore a separate step for heating can be omitted. In a fourth step D4 the adhesive is applied, here by means of a nozzle. It is advantageous if the nozzle moves linearly over the seam area, ejects adhesive and in its position of rest or park position is cleaned by a rotating, moistened sponge, and thereby kept clear (cf. also FIG. 14). Of course, it is also possible to apply the adhesive with a roller for example. If necessary, the adhesive is also applied at a higher temperature. In a last step D5 the transfer into the area of the first holding device carrier 3 is performed. Step D5 thus corresponds to step A1. The rotary disc 10 comprises recesses for this purpose, through which the mandrels can move.

It should be noted at this point, that the rotary axes of the holding device carriers 3, 5 and 9 and the rotary disc 10 do not necessarily need to be parallel—as shown in FIG. 2. It is also possible for example, that the rotary axis of the rotary disc 10 is arranged vertically and the rotary axes of the holding device carriers 3, 5 and 9 are arranged horizontally. The rotary axes of the holding device carriers 3, 5 and 9 and of the rotary disc 10 can also adopt any angle relative to one another, so that it is ensured that the axes of the holding devices 2, 4 and 8 are aligned at the transfer stations or are arranged at least so that a smooth transfer of the outer shell 101 or the inner cup 102 is ensured.

Figure 3:
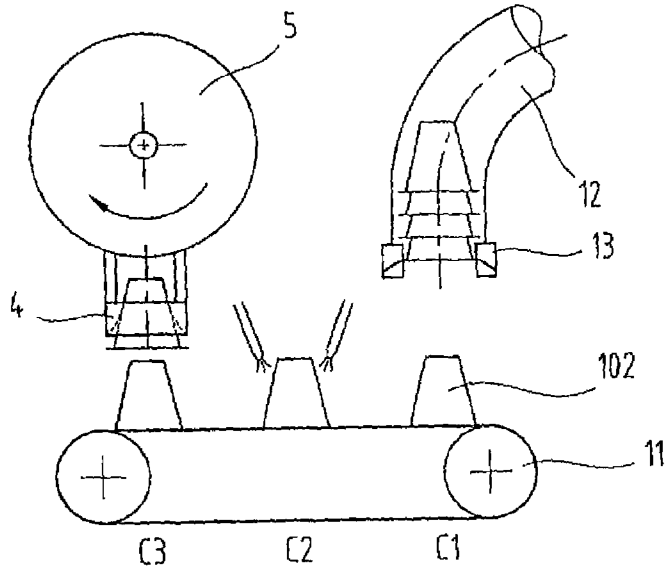
FIG. 3 shows a delivery unit for inner cups by means of a conveyor belt.
Figure 4:
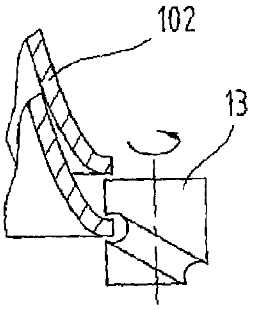
FIG. 4 shows a detail of the delivery unit according to FIG. 3.

FIGS. 3 and 4 show that the coating of the inner cup 102 with adhesive does not necessarily have to be performed on a holding device carrier 9. Instead for example a conveyor belt 11 can be provided on which the inner cups 102 supplied in a tube 12 are placed individually, coated with adhesive and transferred to a second holding device 4 (note: the second holding device carrier 5 is shown with only one holding device 4 in FIG. 3 for simplicity). The separation can be performed for example by means of rollers 13 or wheels, which have a spiral-shaped groove, into which the edge or lid flange of the inner cup 102 connects (cf. the detailed view—FIG. 4). Upon the rotation of the roller 13 the bottom inner cup 102 is separated from the stack until it finally falls out of the groove onto the conveyor belt 11. Steps C1 to C3 correspond to the already explained steps and are therefore not explained in detail.

FIGS. 5 (side view) and 6 (plan view) show that the preparation of the winding of the outer shell 101 also does not necessarily have to be performed on a rotary disc 10. Instead the windings separated from a stack for forming the outer shell 101 can be clamped between a work table 14 and a conveyor belt 15 and conveyed in this way. During the (discontinuous) movement of the conveyor belt 15 the windings are prebent, heated, coated with adhesive and moved into a transfer position. Here the windings move because of their high speed also without the drive of the conveyor belt 15 further over the work table 14, are braked gently by the brushes of a braking brush 16 and then move slowly by means of the guiding rails 17 towards to the stopping blocks 18. They are held there by means of a vacuum, which acts via holes in the working table 14 on the winding. From this position they are taken over by a first holding device 2, which moves through a recess in the work table 14. As soon as the winding of the outer shell 101 is in contact with the first holding device 4, in particular the mandrel, it is secured to the latter here by means of a clamping strip (cf. also FIGS. 7 and 8). Steps A1 to A4 correspond to the already explained steps and are therefore not explained in more detail. (Note: the first holding device carrier 3 is equipped in FIGS. 5 and 6 with only one holding device 2 for simplicity).

Figures 7, 8, 9, 10:
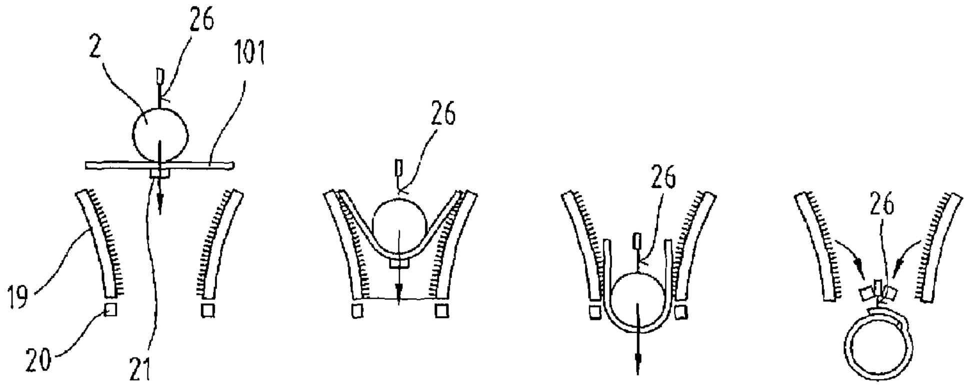
FIG. 7 shows the winding of a winding for forming an outer shell by means of brushes in a first position.
FIG. 8 shows a further position during the winding of the winding.
FIG. 9 shows a further advanced position during the winding of the winding.
FIG. 10 shows the winding wound into the outer shell on the first holding device.

FIGS. 7 to 10 show the sequence, if the winding of the outer shell 101 is wound by means of brushes around the first holding device 2 formed by the mandrel (step A2). FIG. 7 also shows schematically the mandrel and the direction of movement of the latter, two preferably fixed brushes 19, two levers 20 in their position of rest and a clamping strip 21, which presses the middle of the winding of the outer shell 101 (here in side view and still shown in FIG. 7) against the mandrel. The mandrel is located here in a first position of rest, that is the discontinuously moved first holding device carrier 3 remains still here for the transfer process of the provided winding.

In FIG. 8 the mandrel has already moved further slightly owing to the rotational movement of the holding device carrier 3, so that the winding of the outer shell 101 is meanwhile in contact with the two brushes 19 arranged laterally in relation to the plane of movement of the first holding device carrier 3 and is bent by the latter around the mandrel.

In FIG. 9 the mandrel has moved into another intermediate position. By means of this relative movement between the holding device carrier 3 with its first holding devices 2 and the brushes 19 arranged to be fixed in relation to the machine 1 the blank is placed from its ends on the mandrel of the holding device 2. Here the brushes 19 have bent already the winding of the outer shell 101 in this position into a U shape around the mandrel. There is then a further movement until the shown position of FIG. 10 is reached, which represents a further short position of rest for the moved first holding device carrier 3.

FIG. 10 now shows the status in which the levers 20 have also performed and ended their tong-like movement. The blank or the winding has been thereby wound completely around the first holding device 2. Thus the two ends of the winding can be joined at an overlapping seam to the outer shell 101 in interaction with the previously applied adhesive. The pressing of the overlapped ends onto the first holding device 2, in its mandrel, is performed by the previously described clamping lever 26 or stamp. The individual clamping levers 26 are arranged in relation to the holding devices 2 designed as mandrels in the rear circumferential area of the mandrels as seen in rotational direction of the first holding device carrier 3. Said mandrels are possibly adjustable with the stamps arranged thereon from a position spaced apart from the mandrel to a position bearing against the mandrel, in particular by pivoting. If the two ends of the winding are fixed to one another, the two levers 20 can be readjusted to their starting position, whereby then the first holding device carrier 3 is moved into the next predefined holding position. The clamping lever 26, possibly with its stamp, also remains during the further movement of the first holding device carrier 3 in its position close to the mandrel and is moved together with the first holding device carrier 3. Each of the first holding devices 2 is assigned a separate clamping lever 26 or stamp. The complete setting of the adhesive can then be performed during the further movement of the holding device carrier 3.

As soon as the adhesive force of the adhesive is sufficient to prevent the now finished outer shell 101 falling out owing to internal tensions, the clamping lever 26 can be moved back into it position of rest. This is preferably performed very late, in order to maintain as long as possible the pressing force on the overlapping seam. Preferably, the release is performed shortly before reaching the transfer station 6. The levers 20 are arranged in the described example in the region of a workstation, i.e. fixed. Alternatively the levers 20 can also be arranged on a first holding device 2 and moved with the latter or the first holding device carrier 3. Furthermore, the brushes 19 are not designed to be curved necessarily but can also be designed to be straight. Lastly, the brushes 19 can also be moved in order to facilitate the winding process. In particular, rotating brushes are possible here.

Figure 11:
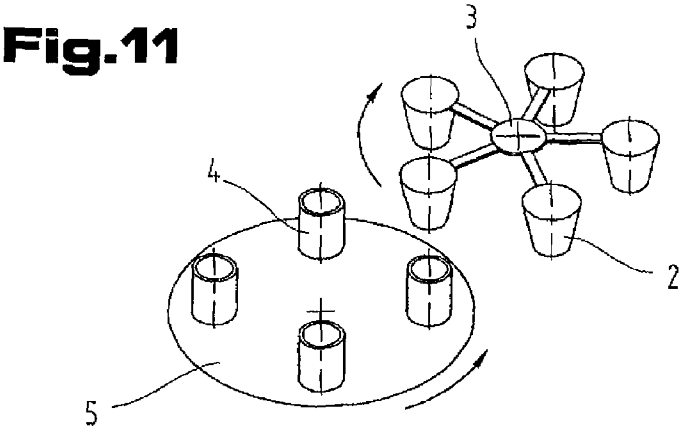
FIG. 11 shows a variant of a machine with holding devices according to the invention which are arranged in the manner of a revolver magazine.

FIG. 11 shows that the invention is not restricted to the star-like arrangement of the holding devices 2, 4 and 8 on their holding device carriers 3, 5 and 9. Rather the latter—as shown in FIG. 11—can also be arranged in the manner of a revolver magazine. In FIG. 11 by way of example first holding devices 2 are arranged in the form of mandrels on a first holding device carrier 3 and second holding devices 4 in the form of sleeves on a second holding device carrier 5. The second holding device carrier 5 is thereby designed in the form of a wheel. The workstations can be designed here similar to the workstations shown in FIG. 2 and are therefore not shown in detail. By means of the modified position of the holding devices 2, 4, in particular the mandrels and the sleeves there is possibly a more economical use of space in the arrangement of the workstation so that the machine 1 is possibly more compact overall. In addition to the workstations the machine 1 also comprises a transfer station, at which a mandrel and a sleeve are opposite one another so that the finished outer shell 101 can be inserted or pushed in by a mandrel into a sleeve.

The axes of the mandrels are aligned in FIG. 11 parallel to the rotary axis of the first holding device carrier 3 and the axes of the sleeves are aligned parallel to the rotary axis of the second holding device carrier 5. This is not absolutely necessary. Rather it is also possible for the axes to be tilted outwards or inwards. However, it should be ensured that the axes of the mandrels and the sleeves are in alignment at the transfer station, so that a smooth transfer of the finished outer shell 101 is possible.

Figure 12:
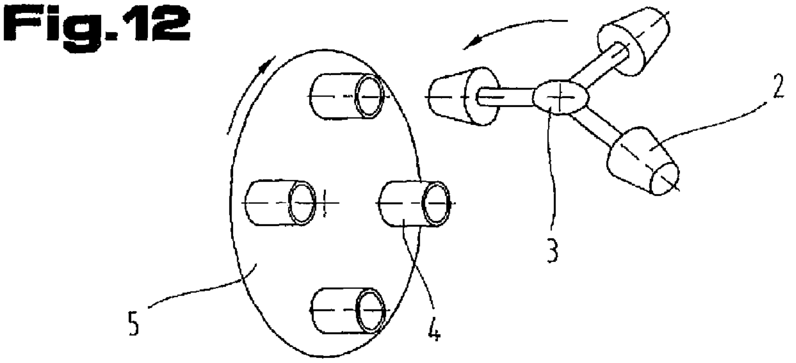
FIG. 12 shows a variant of a machine according to the invention with star-shaped holding devices and holding devices arranged in the manner of a revolver magazine.

FIG. 12 shows a further example similar to the examples shown in FIG. 2 and FIG. 11, in which the first holding devices 2 are arranged star-like on the first holding device carrier 3 and the second holding devices 4 are arranged in the manner of a revolver magazine on the second holding device carrier 5. The axes of the holding device carrier 3 and 5 are aligned at right angles from one another. Here too the first and second holding devices 2 and 4 can be arranged obliquely to the rotary axis of the respective holding device carrier 3 and 5. The angle between the rotary axes of the two holding device carriers 3 and 5 then has to be adjusted if necessary, so that the axes of the holding devices 2 and 4 on the transfer station are in alignment.

Figure 13:
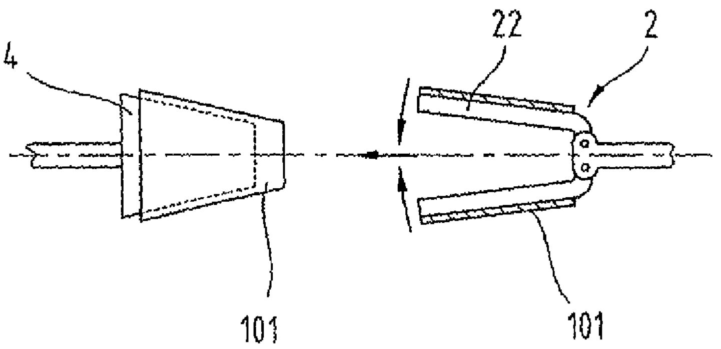
FIG. 13 shows a first holding device in the form of a mandrel with inwardly folding segments.

FIG. 13 shows a modified form of the first holding device 2 in the form of a retractable mandrel. Here several, rotatably mounted segments 22 are distributed around the circumference of the mandrel. In the winding position the segments 22 are folded outwards so that their covering end describes essentially the inner shape of the outer shell 101. In this position the outer shell 101 can be produced. Once the outer shell 101 has been finished and has reached the transfer station, the segments 22 are folded inwards so that the outer shell 101 can be displaced in the direction of the arrow. At the transfer station the outer shell 101 can then be pushed onto an inner cup 102, which rests on a second holding device 4 (here a mandrel).

The main difference from the previously shown machines 1 is therefore that the first and the second holding device 2 and 4 are designed as mandrels and the outer shell 101 is pushed onto an inner cup 102 and not the inner cup 102 into an outer shell 101. This can have advantages in terms of production technology. For example, the inner cup 102 can be gripped and secured by means of a tong-like device on it edge, so that the base of the inner cup 102 can be printed with a stamp (not shown) from the inside out, in order to facilitate the assembly process of the outer shell 101.

Figure 14:
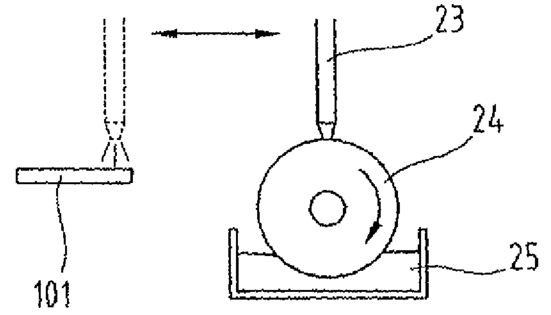
FIG. 14 shows a variant of the invention in which the adhesive nozzle is kept clean by means of a rotating sponge.

Lastly, FIG. 14 shows how a nozzle 23 for applying adhesive (as a rule preferably cold and/or hot glue) can be kept clean by means of a rotating sponge 24, which is immersed in a wash basin 25. After the application of adhesive (shown by dashed lines) the nozzle 23 moves back into its position of rest in which excess adhesive is wiped off the nozzle 23.

Figure 15:
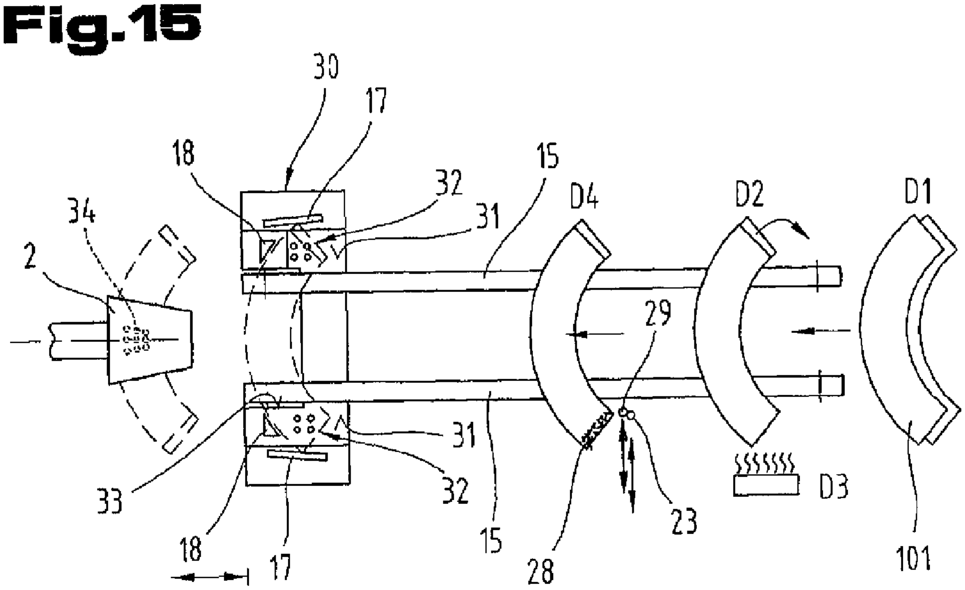
FIG. 15 shows a different possible delivery unit for the windings of outer shells by means of conveyor belts in plan view.
Figure 16:
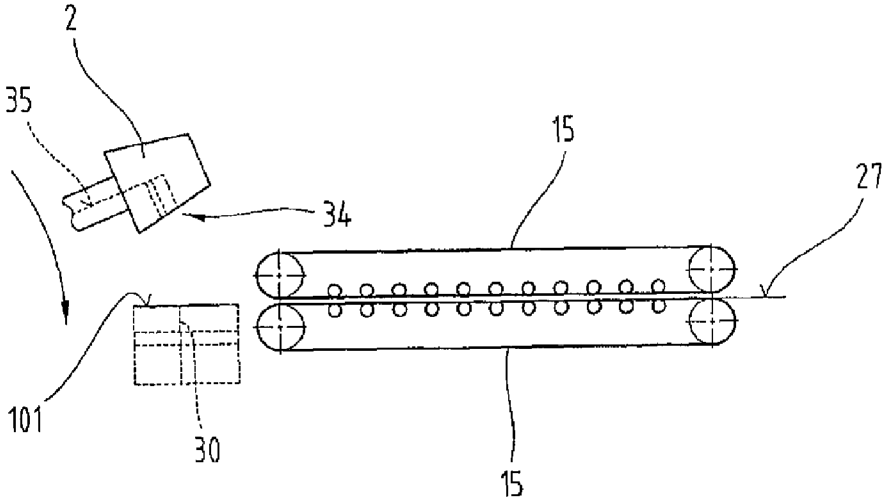
FIG. 16 shows the delivery unit according to FIG. 15, in side view.

In FIGS. 15 and 16 a further and possibly independent embodiment of a preparation station for providing a winding is shown, wherein for the same parts the same reference numerals and component names are used as in the preceding FIGS. 1 to 14. To avoid unnecessary repetition reference is made to the detailed description for the preceding FIGS. 1 to 14.

Here a similar arrangement is shown for preparing a blank, as already performed above in FIGS. 5 and 6. Unlike the previously described representation here the blank or the winding is conveyed by cooperating pairs of conveyor belts 15, wherein the pairs are arranged spaced apart from one another transversely in conveying direction and in this way span between them a conveying plane 27 for the blank. The individual windings for forming the outer shell 101 are separated in a first step D1 from a stack and transferred thus to the two cooperating conveyor belts 15. In a further workstation of said preparation station in a second step D2 the adhesive tab, in particular later the inner tab, can be prebent, as already described above. In the same workstation it is also possible to perform at the same time a third step D3, in which the winding is at least heated. In this way only that section of the winding can be heated which forms the tabs to be adhered. The station for prebending or prebreaking—D2—the seam area is arranged here on the side of the preparation station past which the inner end of the winding in the finished outer shell 101 in the seam area is conveyed. In the present exemplary embodiment the station for prebending—D2—is arranged at the other end from the one for adhesive application.

In a further following workstation the adhesive is applied in a fourth step.

In the exemplary embodiment shown here the adhesive is applied in a simultaneous movement both of the nozzle 23 and the blank or winding in its transport direction by means of the conveyor belts 15. The nozzle 23 is used for the application of adhesive to the seam area, whereby the latter is guided adjustably parallel to the conveying plane and transversely to the conveying direction of the winding. The transverse position of the nozzle 23 is performed preferably in perpendicular direction in relation to the conveying direction of the winding. This is shown in a simplified manner by a double arrow. The transverse adjustment of the nozzle 23 for the application of the adhesive is performed simultaneously and coordinated with the conveying direction of the winding. In this way with suitably coordinated movement speeds relative to one another between the nozzle 23 and the winding a preferably continuous adhesive track 28 can be applied.

With previously known adhesive application devices the further transport of the winding in the region of the adhesive application station is stopped and the adhesive application is performed by means of the nozzle 23 by means of an angular movement aligned according to the winding relative to the conveying direction.

In the present case it is now possible to assign to the first nozzle 23 a further nozzle 29 for the application of adhesive or arrange it directly adjacent thereto and thus to apply in a single, common movement process simultaneously two adhesive tracks 28 in the region of the tabs to be adhered. The two adhesive tracks 28 are applied here in the region of the tab, which is arranged on the outside in the finally aligned state of the outer shell 101. In this way the two previously described levers 20 can perform the winding movement for the complete winding process without scraping of the adhesive.

After the application of adhesive the winding is transferred by means of the cooperating conveyor belts 15 at its end facing the first holding device carrier 3 to a feed slide 30. On said feed slide 30 preferably lateral guiding rails 17 described above and the stopping blocks 18 fixing the position in conveying direction are arranged. If the winding is located at the prepositioned point of the feed slide 30, means are formed on the latter for holding it. In this case the feed slide 30 can be adjusted from a position of taking over the winding from the conveyor belts 15 into the position—A1—providing the winding to the first holding device 2 of the first holding device carrier 3. In this way the winding is conveyed from the area of the conveyor belts 15 into the pivot area of the first holding devices 2 in the region of the first holding device carrier 3. This transferred position of the winding is shown in FIG. 16. The feed slide 30 is indicated only simply by dashed lines.

The previously described means for holding the winding on the feed slide 30 are formed here by support surfaces 31 spaced apart from one another in transverse direction relative to the movement direction of the feed slide 30, in which suction openings 32 open. The latter are line-connected to a not shown suction input of a vacuum generator. By means of the created vacuum the winding transported by the conveyor belts 15 is taken over and held in the positioned point on the feed slide 30. In this prepositioned and held position the adjustment of the feed slide 30 is performed into the pivot area of the first holding device 2.

Furthermore, it is shown in a simplified manner that between the support surfaces 31 of the feed slide 30 spaced apart from one another in transverse direction in said feed slide a recess 33 is formed, through which on preparing—A1—the winding for forming the outer shell 101 at least the first holding devices 2 can be moved. In this way for the transfer of the winding from the feed slide 30 to the first holding device 2 the windings are held until the takeover is performed from the first holding device 2, as already described above. Immediately after the takeover of the winding from the feed slide 30 to the first holding device 2 the shaping of the section is performed to the completely rolled outer shell 101, as already described for FIGS. 7 to 10.

Unlike the previously described holding of the winding on the first holding device 2, in particular the mandrel, by means of the clamping strip 21, here the holding of the winding on the mandrel is performed by at least one opening 34 opening in the circumferential area of the first holding device 2. Preferably however, several of these openings 34 are provided, which are in flow-connection with a line 35 arranged in the mandrel. This line 35 and thus the openings 34 are also in line-connection with a suction input of a vacuum generator not shown in detail. The openings 34 arranged in the mandrel are arranged in this case on the first holding devices 2 in the front circumferential area, as seen in the rotational direction of the first holding device carrier 3. In this section also the first bearing of the winding on the holding device 2 takes place.

Figure 17:
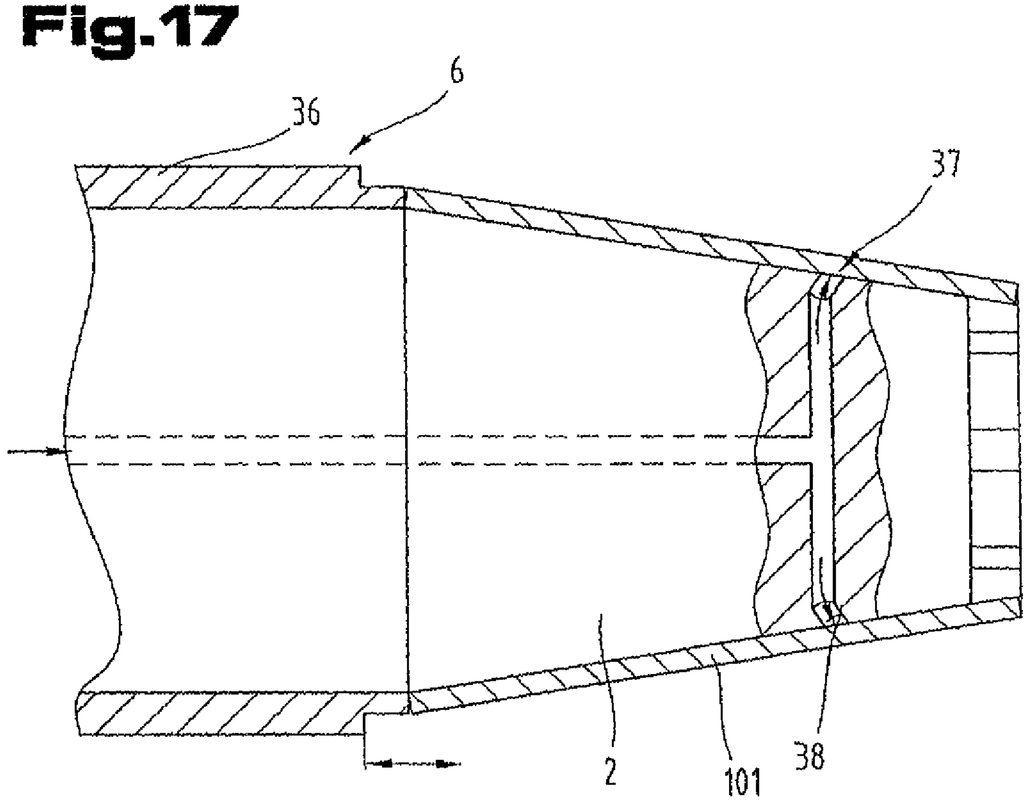
FIG. 17 shows a possible design of the first holding device as a mandrel, in side view, partly in cross section.

In FIG. 17 an additional and possibly independent embodiment of the first holding device 2 is shown, in particular its mandrel, in the region of the first holding device carrier 3, wherein for the same parts the same reference numerals or component names are used as for the preceding FIGS. 1 to 16. To avoid unnecessary repetition reference is made to the detailed description of the preceding FIGS. 1 to 16.

As described above for FIG. 2 the transfer station 6 is provided in the region of the transfer station A4, B1 between the first holding device carrier 3 and the second holding device carrier 5. In the present exemplary embodiment on the first holding device 2 designed as a mandrel at its end region closer to the holding device carrier 3 a sleeve 36 mounted displaceably in axial direction relative to the mandrel is arranged. Said sleeve 36 can be adjusted according to the double arrow shown axially in relation to the mandrel. This can be performed preferably for detaching the outer shell 101 formed from the blank from the winding mandrel. By means of this releasing process owing to the iconicity of the winding mandrel a free space is created between the inner side of the outer shell 101 and the mandrel and thus can be transferred in the region of the transfer—A4, B1—to the second holding device carrier 5, in particular the second holding device 4 designed as a ring.

To facilitate the transfer of the completely wound outer shell 101 it is advantageous if at least one first outlet opening 37 opens at the first holding device 2 designed as a mandrel on its circumference and the latter is line-connected with a pressure generator here not shown in detail, in particular for compressed air. To achieve a more even transfer it is advantageous if over the circumference of the first holding devices designed as a mandrels several such outflow openings 37 are provided or arranged. Particularly preferably, in the area of the first outflow opening 37 or the first outflow openings 7 a circumferential channel 38 can be arranged in the first holding device 2 designed as a mandrel. Here the first outflow opening or outflow openings 37 open into the channel 38. To achieve a directed transfer, from the first holding device 2 to the second holding device 4, it is advantageous if the first outflow opening 37 and/or the channel 38 is aligned so that the latter have an outflow direction directed to the side facing away from the center of the first holding device carrier 3. In this way it is possible to transfer the wound outer shell 101 into the mount of the second holding device 4.

Figure 18:
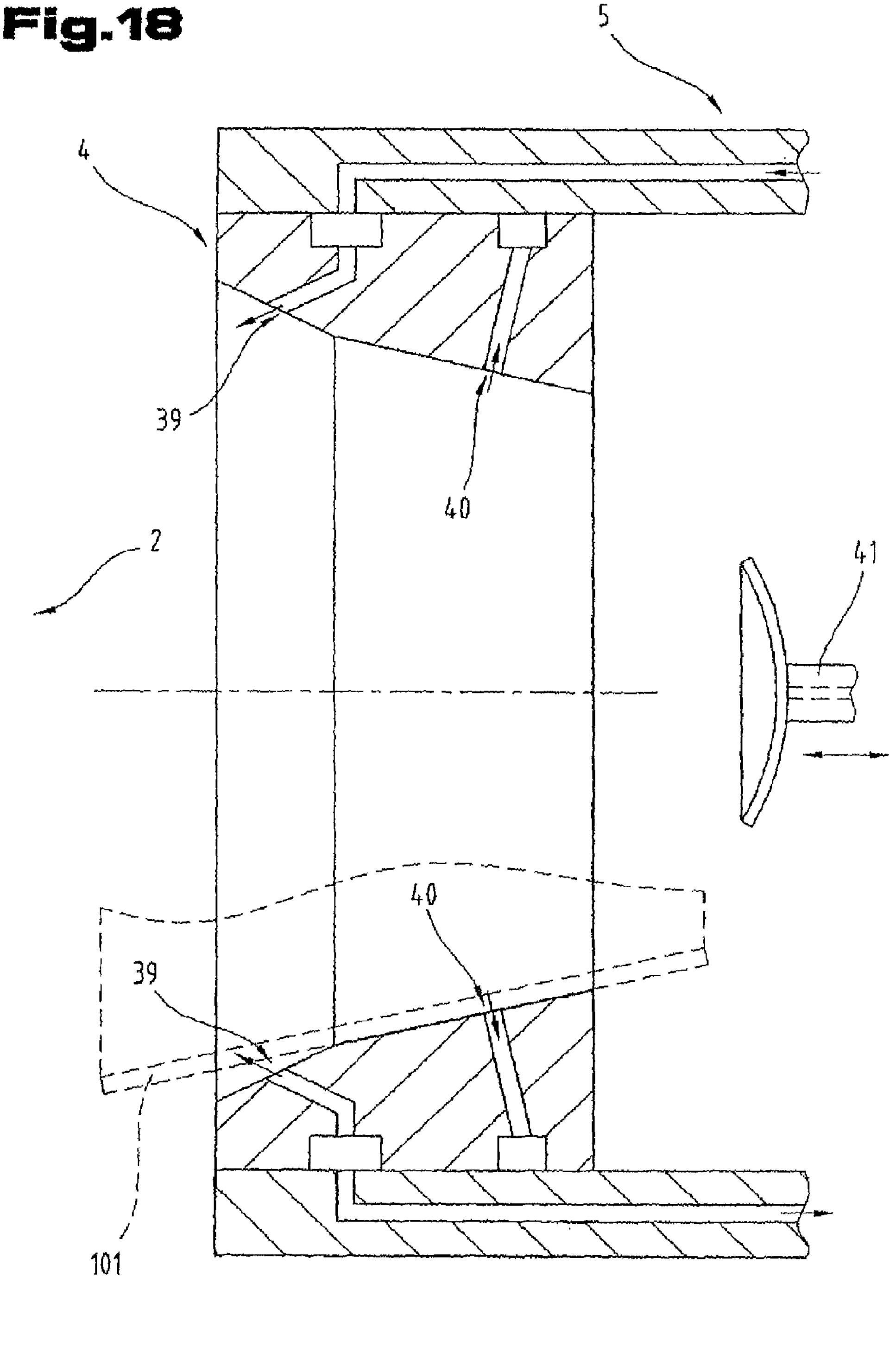
FIG. 18 shows a possible design of a second holding device as a ring or sleeve, in side view in cross section.

In FIG. 18 a further and possibly independent embodiment of the second holding device 4 is shown, in particular of the ring or hollow mandrel, wherein for the same parts the same reference numerals or component names are used as in the preceding FIGS. 1 to 17. To avoid unnecessary repetition reference is made to the detailed description of the preceding FIGS. 1 to 17.

The here ring-shaped, second holding device 4 is used for mounting the outer shell 101 wound in the first workstation and then for inserting the inner cup 102 to complete the cup 100.

To facilitate the transfer or takeover of the outer shell 101 from the first holding device 2, it is advantageous to arrange or provide at least one second outflow opening 39 in an inner circumferential area of the second holding device 4 designed here as a sleeve or ring. Preferably, several such second outflow openings 39 are arranged distributed evenly over the circumference and can be line-connected via a distributor channel with a pressure generator, in particular for compressed air.

The second outflow openings 39 are aligned so that the latter have an outflow direction directed in the direction of the first holding device 2 of the first holding device carrier 3. Preferably, however the outflow direction is directed towards the center of the mandrel. By steering the medium flow accordingly from the second outflow opening 39 to the mandrel 2 and deflecting the latter, the transfer of the outer shell 101 into the second holding device 4 is performed in the mariner of a counterflow movement.

It is also shown here that on the inner circumference area, at least one second opening 40 of a line arranged in the sleeve or the ring opens in the second holding device 4 designed as a sleeve or ring, which opening possibly with the interconnection of a distribution channel is in line connection with a suction input of a vacuum generator. In this way the outer shell 101 inserted into the second holding device 4 can be fixed on its outer circumference. Said transfer or taking over of the outer shell 101 from the first holding device 2 to the second holding device 4 is performed at the interface of the workstations A4, B1. The previously described readjustment of the outer shell 101 or positioning thereof in the second holding device 4 and the additional subsequent steps can be performed in a similar way to the one described in detail above.

The previously described transfer of the blank or the winding from the feed slide 30 to the first holding device 2 can be determined by the selected relative end position of the feed slide 30 to the mandrel of the first holding device 2 the size ratio of the outer shell 101 to be produced. The further the feed slide 30 is adjusted to the center of the first holding device carrier 3, the greater the outer shell 101 in its circumferential dimension, in particular its diameter. If the adjustment is not so far the circumferential dimension is reduced accordingly. By means of this deliberate adjustment not only can the joining process between the inner cup 102 and the outer shell 101 be varied but also the clamping force of the outer shell 101 on the inner cup 102 can be determined. The narrower or smaller the outer shell 101 the more securely the latter sits on the inner cup 102.

Figure 19:
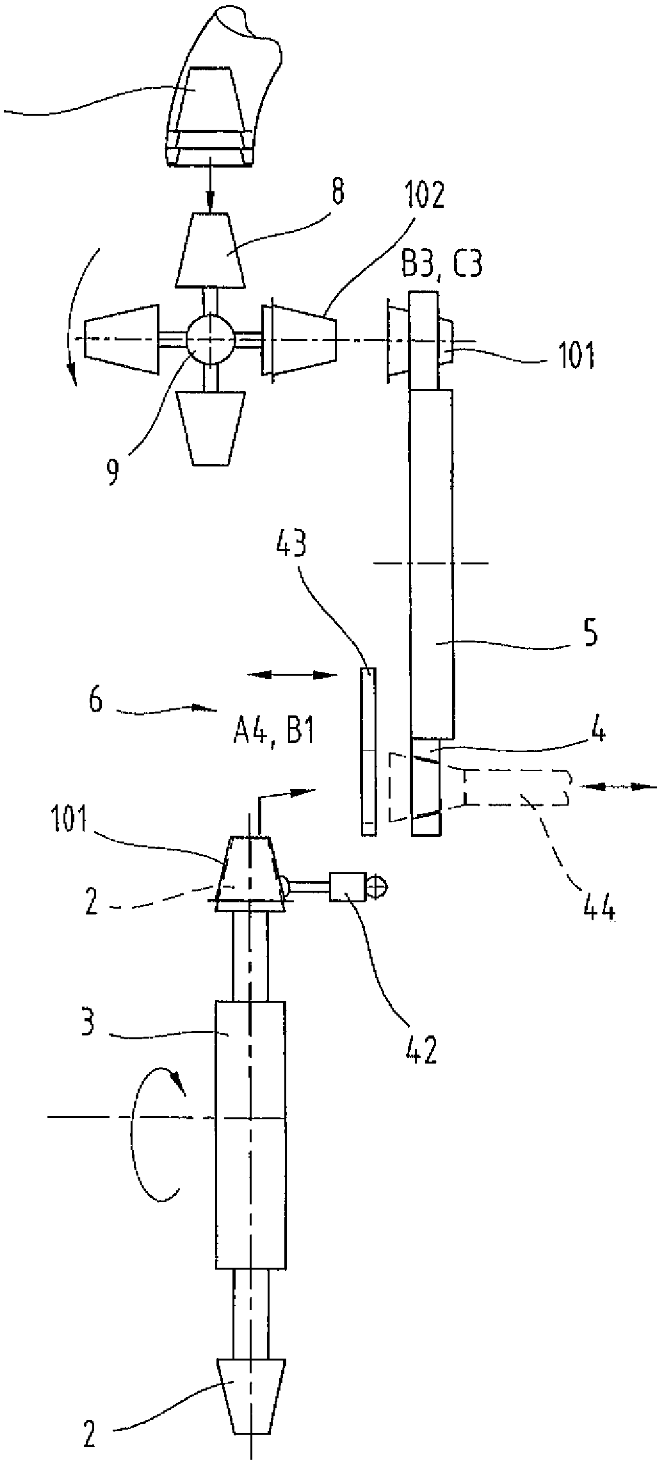
FIG. 19 shows a further variant of a machine according to the invention with star-like arranged holding devices.

FIG. 19 shows an additional and possibly independent embodiment of the machine 1, wherein for the same parts the same reference numerals or component names are used as in the preceding FIGS. 1 to 18. To avoid unnecessary repetition reference is made to the detailed description of the preceding FIGS. 1 to 18.

The holding device carrier 3 with its first holding devices 2 arranged thereon for producing the outer shells 101 from the windings can be designed in a similar way, as already described for FIG. 2. The rotary axis of the first holding device carrier 3 is preferably arranged to be horizontal.

The second holding device carrier 5 with its second holding devices in the form of sleeves or rings also has a preferably horizontal axis of rotation. Unlike the previously described exemplary embodiment, the two axes of rotation of the first and second holding device carrier 3, 5 are aligned parallel to one another, but in the region of the transfer station 6—A4, B1—the longitudinal axes of the two holding devices 2, 4 are aligned to cross one another, in particular at right angles.

The transfer is performed here by a separate transfer device 42, which is formed for example by a lever and pivot mechanism. The transfer device 42 comprises for example a vacuum suction device and pulls with the latter the finished outer shell 101 from the first holding device 2 in axial direction until a pivot movement can be performed about an angle of e.g. 90°. Thus in the present exemplary embodiment a pivot angle is reached which corresponds to the relative alignment of the second holding device 4 with its longitudinal or mounting axis. At a different angle of inclination of the two longitudinal axes of the first holding device 2 or the second holding device 4 relative to one another, the pivot angle to be executed should be adjusted accordingly.

In the position of the outer shell 101 for mounting in the second holding device 4 the said outer shell is surrounded by schematically simplified gripping tongs 43 on their outer circumference. As the outer shell 101 is formed by a circumferentially relatively unstable material, the latter can also be supported internally by tensioning tongs 44 adjustable by the second holding device 4 in axial direction, which mounts the outer shell 101 bearing on its inner side. By means of the tensioning tongs 44 the outer shell 101 prepositioned by the gripping tongs 43 is taken over, and inserted or drawn into the second holding device 4. After this insertion process the prepositioned pressing in a separation workstation can be performed, as described above for the workstation B2. Afterwards the inner cup 102 can be inserted into the prepositioned outer shell 101. This can be performed by means of a third holding device carrier 9 and third holding devices 8 arranged thereon, as described above for FIG. 2. Said transfer station is denoted by B3, C3. The fitting of the third holding devices 8 with the inner cups 102 can be performed similarly, as already described in detail above.

The exemplary embodiments show possible embodiment variants of a machine according to the invention, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the machine 1 the latter and its components have not been represented true to scale in part and/or have been enlarged and/or reduced in size.

The problem addressed by the independent solutions according to the invention can be taken from the description.

Mainly the individual embodiments shown in FIGS. 2; 3, 4; 5, 6; 7, 8, 9, 10; 11; 12; 13; 14; 15, 16; 17; 18; 19 can form the subject matter of independent solutions according to the invention. The objectives and solutions according to the invention relating thereto can be taken from the detailed descriptions of these figures.

LIST OF REFERENCE NUMERALS

| | |
|---|---|
| 1 | machine |
| 2 | first holding device |
| 3 | first holding device carrier |
| 4 | second holding device |
| 5 | second holding device carrier |
| 6 | transfer station |
| 7 | guiding rod |
| 8 | third holding device |
| 9 | third holding device carrier |
| 10 | rotary disc |
| 11 | conveyor belt |
| 12 | tube |
| 13 | roller |
| 14 | work table |
| 15 | conveyor belt |
| 16 | braking brush |
| 17 | guiding rail |
| 18 | stopping block |
| 19 | brush |
| 20 | lever |
| 21 | clamping strip |
| 22 | segment |
| 23 | nozzle |
| 24 | sponge |
| 25 | water basin |
| 26 | clamping lever |
| 27 | conveying plane |
| 28 | adhesive track |
| 29 | nozzle |
| 30 | feed slide |
| 31 | support surface |
| 32 | suction opening |
| 33 | recess |
| 34 | first opening |
| 35 | line |
| 36 | sleeve |
| 37 | first outflow opening |
| 38 | channel |
| 39 | second inflow opening |
| 40 | second opening |
| 41 | transfer means |
| 42 | transfer device |

-continued

| | |
|---|---|
| 43 | gripping tongs |
| 44 | tensioning tongs |
| 100 | cup |
| 101 | outer shell |
| 102 | inner cup |
| A1 . . . A4 | first workstations |
| B1 . . . B7 | second workstations |
| C1 . . . C3 | third workstations |
| D1 . . . D5 | fourth workstations |

The invention claimed is:

1. A machine for producing a cup made of composite material, namely from an outer shell and an inner cup, comprising:

a plurality of first holding devices, which are arranged on a first rotatably mounted star- or wheel-like holding device carrier, a plurality of second holding devices, which are arranged on a second rotatably mounted star- or wheel-like holding device carrier, at least one first workstation arranged in the region of the first holding devices for performing at least one of the steps: providing a winding for forming the outer shell, winding the winding onto or into one of the first holding devices, compressing and/or adhering ends of the winding wound onto or into one of the first holding devices, with the ends forming a seam area of the outer shell, a transfer station for transferring a finished outer shell from one of the first holding devices of the first holding device carrier to one of the second holding devices of the second holding device carrier, at least one second workstation arranged in the region of the second holding devices for performing at least one of the steps: pushing the outer shell into one of the second holding devices or pushing the inner cup onto one of the second holding devices, pushing a finished inner cup into the finished outer shell or pushing the finished outer shell onto the finished inner cup, checking finished cups, rejecting defective cups, removing the finished cups from the second holding device, and a preparation station for, prior to providing the winding for forming the outer shell, prebending one of the ends of the winding for forming an adhesive tab in the seam area and performing at least one of the following steps: separating one of the windings for forming the outer shell from a stack, heating the seam area or the entire winding, applying an adhesive in the seam area.

2. The machine as claimed in claim 1, comprising a plurality of third holding devices, which are arranged on a third rotatably mounted star- or wheel-like holding device carrier, at least one third workstation arranged in the region of the third holding devices for performing at least one of the steps: separating the finished inner cup from a stack, applying adhesive onto the outside of the inner cup and a transfer station for transferring a finished inner cup from a third holding device to a second holding device.

3. The machine as claimed in claim 1, wherein the first holding devices are in the form of mandrels.

4. The machine as claimed in claim 3, wherein at least one first opening of a line arranged in the mandrel opens at the first holding devices in the form of mandrels on the front circumferential area as seen in rotary direction of the first holding device carrier and said opening is in line-connection with a suction input of a vacuum generator.

5. The machine as claimed in claim 3, wherein a sleeve mounted displaceably in axial direction relative to the mandrel is arranged on the first holding device designed as a mandrel on its end section closer to the holding device carrier, in order to release the outer shell wound onto the mandrel for the transfer of the mandrel to the transfer station.

6. The machine as claimed in claim 3, wherein at least one first outflow opening opens at the first holding devices in the form of mandrels at their periphery and said outflow opening is line-connected to a pressure generator, in particular for compressed air.

7. The machine as claimed in claim 6, wherein several first outflow openings are arranged around the periphery of the first holding devices designed as mandrels.

8. The machine as claimed in claim 6, wherein in the area of the first outflow opening or the first outflow openings a circumferential channel is arranged in the holding device designed as a mandrel and the first outflow opening opens into the circumferential channel.

9. The machine as claimed in claim 8, wherein the first outflow opening and/or the circumferential channel is aligned such that the circumferential channel has an outflow direction directed to the side facing away from the center of the first holding device carrier.

10. The machine as claimed in claim 1, wherein the second holding devices are designed in the form of sleeves or rings.

11. The machine as claimed in claim 10, wherein in an inner circumferential area of the second holding device designed as a sleeve or ring at least one second outflow opening is arranged.

12. The machine as claimed in claim 11, wherein the second outflow opening is aligned such that the second outflow opening has an outflow direction aligned in the direction of the first holding device of the first holding device carrier.

13. The machine as claimed in claim 12, wherein the outflow direction of the second outflow opening directed to the first holding device is directed to the center of the mandrel.

14. The machine as claimed in claim 10, wherein at least one second opening of a line arranged in the sleeve or the ring opens in an inner circumferential area of the second holding device designed as a sleeve or ring and said opening is in line connection with a suction input of a vacuum generator.

15. The machine as claimed in claim 2, wherein the third holding devices are designed in the form of mandrels.

16. The machine as claimed in claim 3, wherein the first holding devices are designed in the form of mandrels, the second holding devices are designed in the form of sleeves or rings and the third holding devices are designed in the form of mandrels.

17. The machine as claimed in claim 1, wherein the workstation for winding the winding of the outer shell onto a first holding device designed as a mandrel comprises brushes, which brush the winding on the rotation of the first holding device carrier in a U-shape onto the mandrel.

18. The machine as claimed in claim 17, wherein the workstation for winding the winding of the outer shell onto the first holding device designed as a mandrel comprises levers, which completely wind the winding around the mandrel, wherein the winding is pre-bent into the U-shape by laterally arranged brushes.

19. The machine as claimed in claim 18, wherein the brushes and the levers are fixed on a machine frame of the machine.

20. The machine as claimed in claim 3, wherein each of the first holding devices is assigned its own clamping lever and the clamping lever is mounted pivotably on the first holding device carrier relative to the first holding device.

21. The machine as claimed in claim 20, wherein the clamping levers in relation to the first holding devices are arranged respectively on the rear circumferential area of the first holding devices as seen in the direction of rotation of the first holding device carrier and each clamping lever is adjustable with its stamp from a position spaced apart from the respective first holding device to a position bearing against the first holding device.

22. The machine as claimed in claim 1, wherein the axes of the first and/or second and/or third holding devices are aligned star-like on the respective holding device carrier.

23. The machine as claimed in claim 2, wherein the axes of the first and/or second and/or third holding devices are aligned in the manner of a revolver magazine on the respective holding device carrier.

24. The machine as claimed in claim 1, wherein first and second preparation stations are provided, the first preparation station prebending the seam area and being arranged on the side of the second preparation station, past which the inner end of the winding in the seam area in the finished outer shell is conveyed.

25. The machine as claimed in claim 1, wherein the preparation station comprises cooperating pairs of conveyor belts and the pairs are arranged spaced apart from one another, as viewed in conveying direction transversely to the conveying direction, and in this way span a conveying plane.

26. The machine as claimed in claim 25, wherein the preparation station at the end of the conveyor belts facing the first holding device carrier comprises a feed slide having a device for holding the winding to form the outer shell and wherein the feed slide can be adjusted from a first position taking the winding from the conveyor belts into a second position providing the winding to the first holding device of the first holding device carrier.

27. The machine as claimed in claim 26, wherein the device for holding the winding on the feed slide are formed by support surfaces spaced apart from one another in transverse direction in relation to the direction of movement of the feed slide, into which support surfaces suction openings run, and the latter are in line-connection with a suction input of a vacuum generator.

28. The machine as claimed in claim 26, wherein a recess is formed between the support surfaces of the feed slide spaced apart from one another in transverse direction, through which recess on preparing the winding to form the outer shell at least the first holding device can be moved.

29. The machine as claimed in claim 1, wherein the preparation station comprises a preparation station for applying the adhesive in the seam area wherein said preparation station comprises at least one nozzle facing the seam area and said nozzle is guided adjustably parallel to a conveying plane and transversely to a conveying direction of the winding.

30. The machine as claimed in claim 29, wherein the transverse adjustment of the nozzle is performed in perpendicular direction relative to the conveying direction of the winding.

31. The machine as claimed in claim 29, wherein the transverse adjustment of the nozzle for applying the adhesive is performed simultaneously with the conveying movement of the winding.

32. The machine as claimed in claim 29, wherein the nozzle is kept clean in a position of rest by a moistened, rotating sponge.

33. The machine as claimed in claim 29, wherein the preparation station for applying adhesive to the seam area is arranged on the side of the preparation station past which the outer end of the winding in the seam area of the finished outer shell is conveyed.

34. A method for producing a cup made of composite material, namely from an outer shell made of a first material and an inner cup made of a second material, comprising the steps:

prior to providing a winding for forming an outer shell, prebending one of the ends of the winding for forming an adhesive tab in a seam area, the ends forming the seam area of the outer shell, and performing at least one of the following steps: separating the winding for forming the outer shell from a stack, heating the seam area or the entire winding, and applying an adhesive in the seam area, providing the winding for forming the outer shell and performing at least one of the following steps: winding the winding onto or into a first holding device and compressing and/or adhering the ends of the winding wound onto or into a first holding device, in at least one first workstation arranged in the region of a first holding device, which is arranged on a first rotatably mounted star- or wheel-like holding device carrier, transferring a finished outer shell from the first holding device onto a second holding device, which is arranged on a second rotatably mounted star- or wheel-like holding device carrier, in the region of a transfer station and performing at least one of the steps: pushing the outer shell into or pushing the inner cup onto a second holding device, pushing a finished inner cup into the finished outer shell or pushing the finished outer shell onto the finished inner cup, checking finished cups, rejecting defective cups, removing the finished cups from the second holding device in at least one second workstation arranged in the region of the second holding device.

* * * * *

UNITED STATES PATENT AND TRADEMARK OFFICE

CERTIFICATE OF CORRECTION

PATENT NO. : 8,603,276 B2
APPLICATION NO. : 13/386192
DATED : December 10, 2013
INVENTOR(S) : Riethmueller et al.

It is certified that error appears in the above-identified patent and that said Letters Patent is hereby corrected as shown below:

On the Title Page

In particular, under (75):

"Inventor: Steffen Riethmueller, Widnau (CH)"

should be corrected to read:

--Inventors: Steffen Riethmueller, Widnau (CH)
Uwe MESSERSCHMID, Alberhausen (DE)--.

Signed and Sealed this
Twenty-fourth Day of February, 2015

Michelle K. Lee

Michelle K. Lee
*Deputy Director of the United States Patent and Trademark Office*